Figures 1, 7:
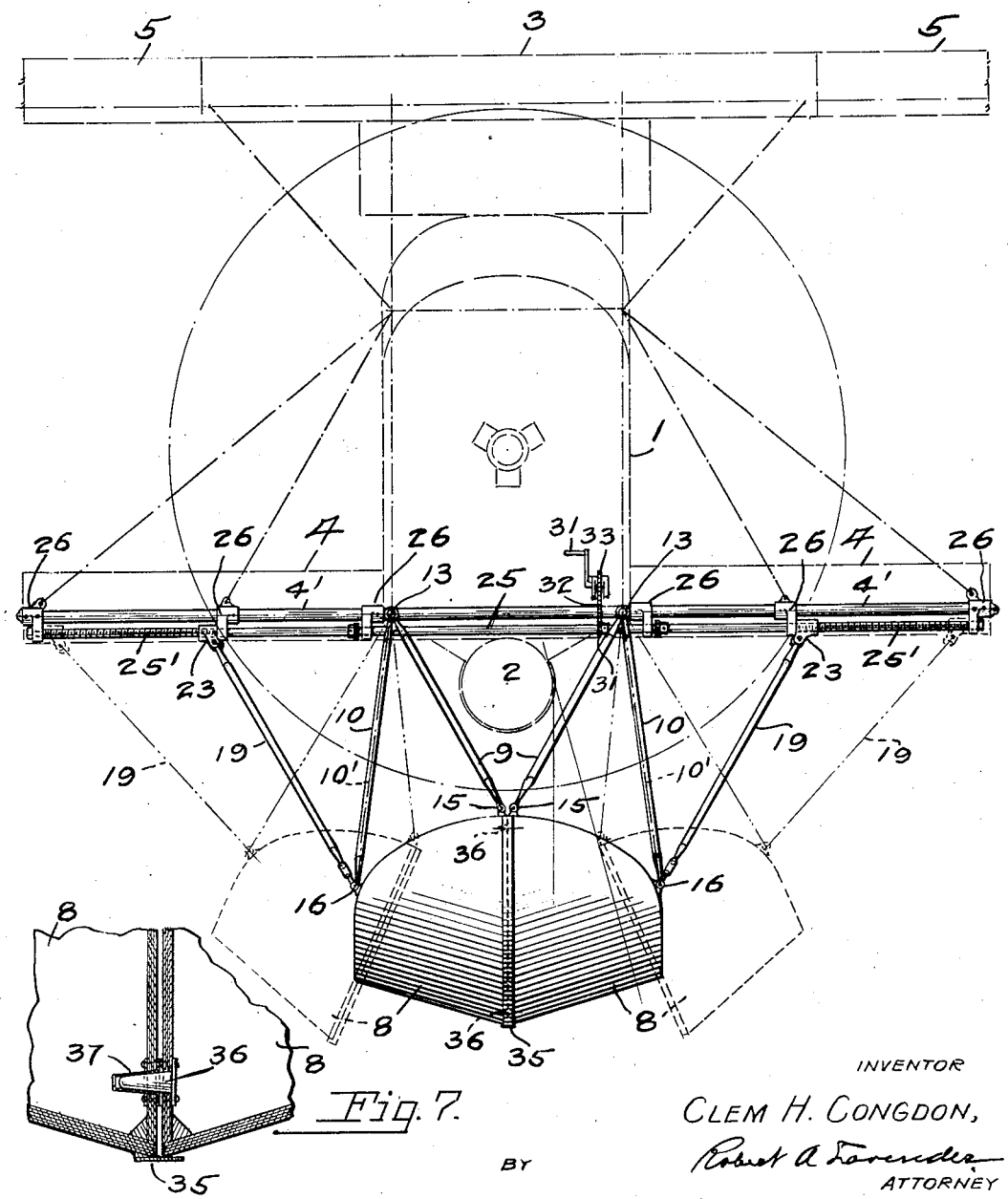

Aug. 23, 1927.

C. H. CONGDON 1,639,796

AIRCRAFT

Filed Feb. 28, 1927 4 Sheets-Sheet 1

INVENTOR
CLEM H. CONGDON,
BY
ATTORNEY

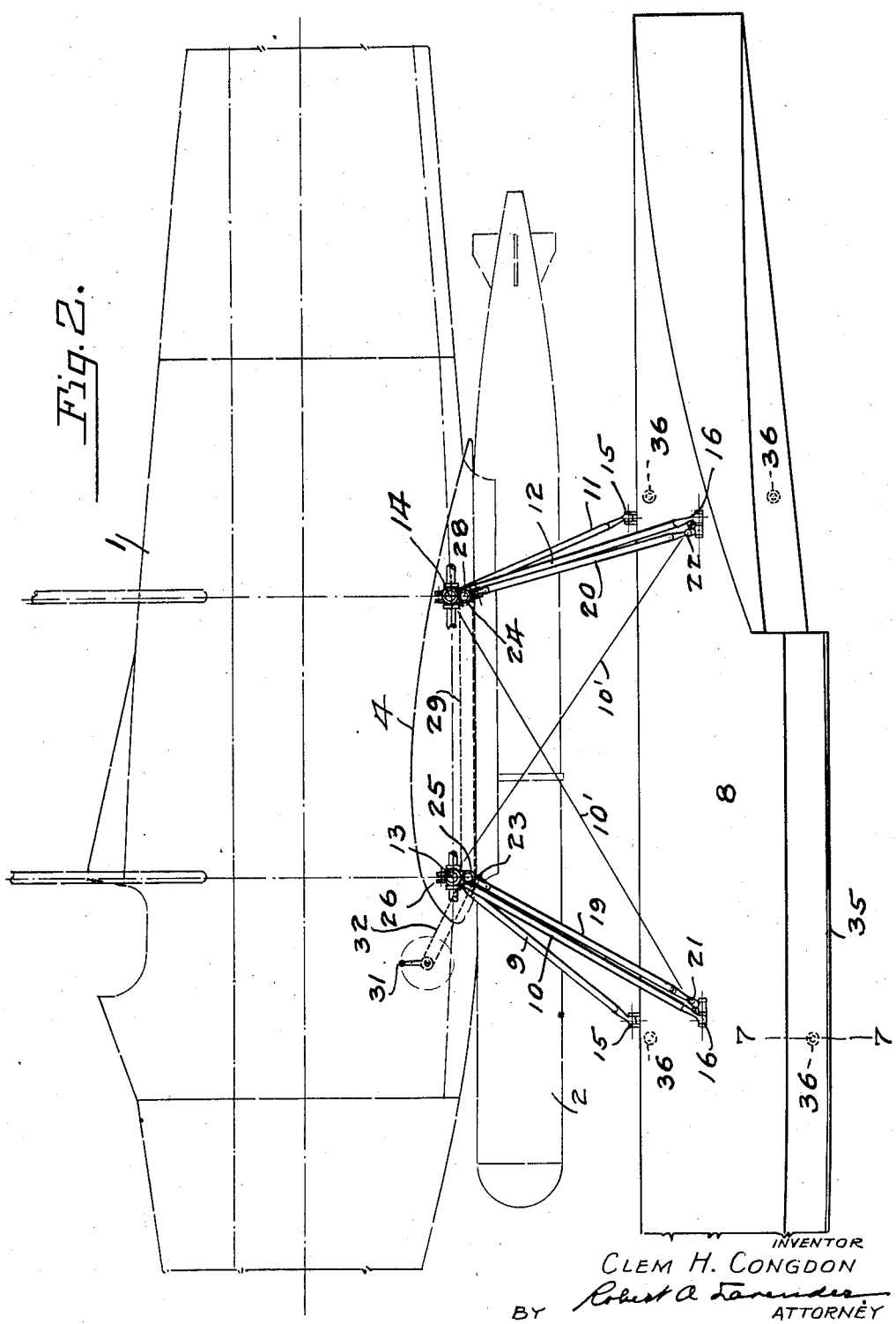

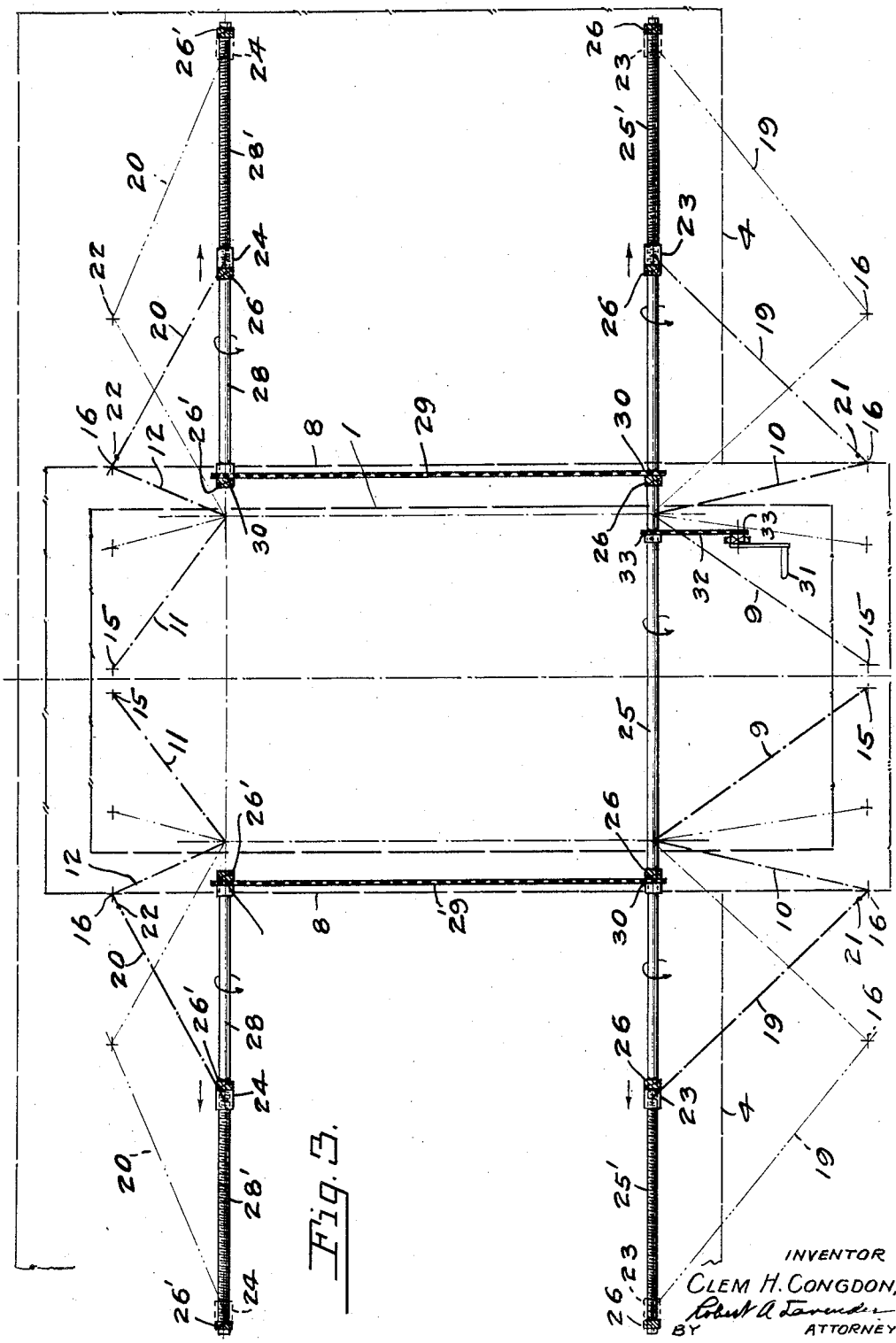

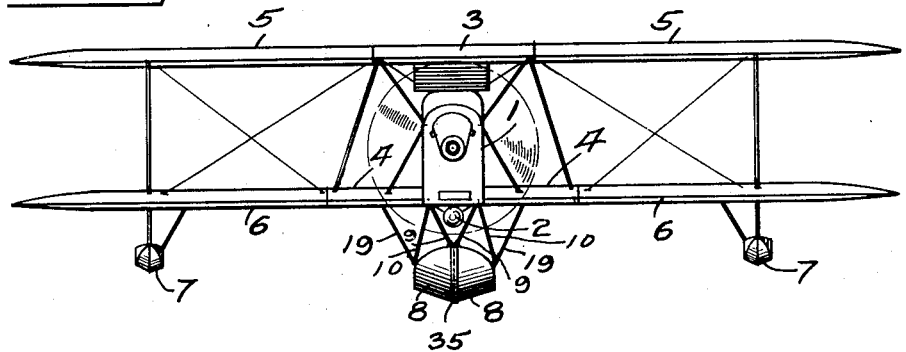
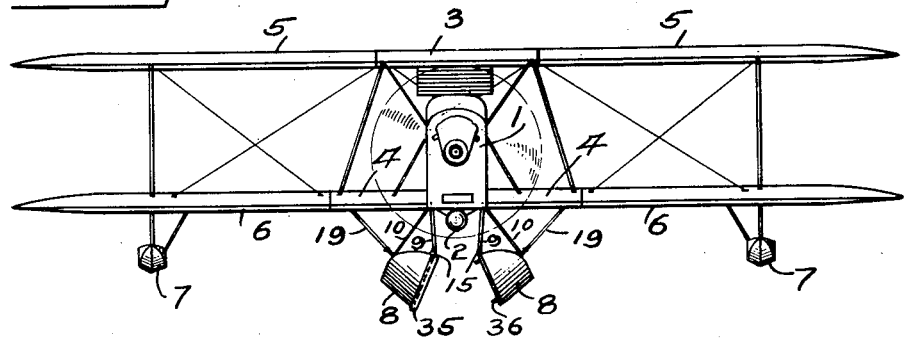
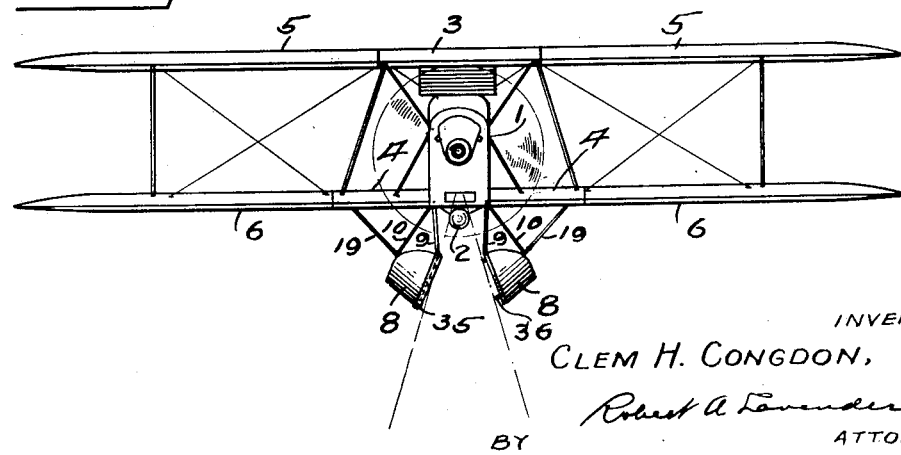

Patented Aug. 23, 1927.

1,639,796

UNITED STATES PATENT OFFICE.

CLEM H. CONGDON, OF CLEVELAND, OHIO.

AIRCRAFT.

Application filed February 28, 1927. Serial No. 171,477.

My invention relates broadly to aircraft and more particularly to the floats or pontoons therefor.

An object of my invention is to provide a centrally located float that may be divided, the sections being capable of separation to permit the dropping of torpedoes, or other objects, from an aircraft.

Another object is to provide a novel arrangement of a divided single float and an operating and positive locking mechanism whereby the sections of the float are rigidly held together or spread apart in order that the aircraft may take-off or land upon water with the float in either opened or closed position.

With the above and other objects in view the invention consists in the construction, combination and arrangement of parts as will be hereinafter described.

Reference is to be had to the accompanying drawings forming part of this specification, in which like reference characters indicate corresponding parts throughout the several views, and in which—

Figure 1 is a partial front elevation of an aircraft, having incorporated therein the features of my invention, Figure 2 is an enlarged partial side elevation, showing the arrangement of the float and operating mechanism, Figure 3 is a partial plan view showing the arrangement of the operating mechanism, Figure 4 is a front elevation showing the divided central float in closed position in combination with auxiliary or wing-tip floats for lateral stability, Figure 5 is a similar view showing the divided central float in open position in combination with auxiliary or wing-tip floats, Figure 6 is a front elevation showing the divided central float in open position with the wing-tip floats omitted, and Figure 7 is a section on the line 7—7 of Figure 2.

Referring more particularly to the drawings, 1 indicates the body portion of an aircraft carrying a torpedo 2, it being understood that other objects, such as a bomb, fuel tank, or the like, may be substituted for the torpedo, if desired. Upper and lower inboard wing sections 3 and 4 respectively are connected to the body 1 and to these are respectively connected the outboard wing portions 5 and 6. The wing portions 6 are provided with conventional auxiliary wing-tip floats 7, but, if desired and under certain conditions, these floats may be omitted.

A divided central float is hingedly connected at 13 and 14 to the lower structure of the main portion of the aircraft by bracing struts 9, 10, 11, and 12, and is stabilized by struts 19 and 20. The main structure referred to is shown for illustrative purposes as the body 1 and wing portions 4. The bracing struts are attached to the divided float at 15 and 16. Fore and aft diagonal bracing is accomplished by wires 10' located in the plane of the bracing struts 10 and 12. The sections of the divided float are held rigid in adjusted position by the struts 19 and 20 connected at their lower ends to the sections of the float at 21 and 22, and at their upper ends to internally threaded guide fittings 23 and 24.

The movement of the guide fittings 23 is controlled by a rotatable shaft 25 supported in bearings 26 that are secured to the frame structure 4' of the wing portions 4. Movement of the guide fittings 24, see Fig. 3, is effected by shafts 28 actuated by chains 29 passing over sprocket gears 30 secured to shafts 25 and 28. Bearings 26' for shafts 28 are supported by the after frame structure of the wing portions 4 that correspond in construction to the part 4'.

Portions 25' and 28' of shafts 25 and 28 respectively are of opposite thread on starboard and port sides of the aircraft. Movement of the float sections is accomplished by rotation of the oppositely threaded portions that engage with the internally threaded guide fittings 23 and 24 respectively, causing them to move in or out in a transverse direction. The pitch between the threads of portions 25' and 28' and fittings 23 and 24 is such that the sections of the float may be rigidly secured in any position. The rotary movement for operating the shaft 25 is obtained by a crank 31 conveniently located in the cockpit of the aircraft and which transmits motion to the shaft through a chain 32 mounted on sprockets 33 secured to the crank shaft and shaft 25.

In order to prevent water or air from finding its way between the inboard sides of the divided float when in closed position, I have provided a flange 35 attached to one of the sections to cover the keel line of the float when the sections are joined.

In addition to the rigidity obtained in the float by the bracing strips and worm locking mechanism, I have provided studs 36 on the inboard side of one of the sections that engage in sockets 37 located on the inboard side of the other section when the float is closed, thereby providing a positive shear bracing.

The rugged mounting for the float will enable landing on water with the float in any position of intermediate adjustment, or in either extreme opened or closed position.

It will be understood that the above description and accompanying drawings comprehend only the general and preferred embodiment of my invention and that various minor changes in details of construction, proportion and arrangement of parts may be made within the scope of the appended claims and without sacrificing any of the advantages of my invention.

Having described my invention what I claim is:

1. In an aircraft, in combination, a centrally located divisible float, and means for dividing the float and locking it in its divided position.

2. In combination with an aircraft, a divisible central float, manually controlled means for dividing the float, and means for maintaining the float in either opened or closed position.

3. In combination with an aircraft, a central float consisting of sections hingedly connected to the aircraft, means for imparting motion to the sections for their separation, and means for maintaining them in such position.

4. In combination with an aircraft, a central divisible float, laterally extending oppositely threaded shafts, guide fittings operable on the shafts, and means for imparting motion to the fittings along the shafts whereby the float is caused to divide.

5. In combination with an aircraft, a central float comprising divisible sections, struts hingedly connected to the aircraft and to which the sections are hingedly connected, oppositely threaded shafts, guide fittings operable on the shafts, means connecting the sections and fittings, and means for imparting motion to the fittings to control the sections.

6. In combination with an aircraft, a central divisible float, and means for opening, closing, and maintaining in either of such positions the parts of the float, said means comprising interconnected shafts, guide fittings operable on the shafts, and means for imparting motion thereto.

7. In combination with an aircraft, a centrally located divisible float comprising sections hingedly connected to the aircraft, and means for preventing seepage of a fluid between the sections when in a closed position.

8. In combination with an aircraft, a centrally located divisible float comprising sections hingedly connected to the aircraft, and a flange connected to one of the sections and extending over the other section when the float is in closed position.

9. In combination with an aircraft, a centrally located divisible float consisting of a plurality of sections hingedly connected to the aircraft, mechanism for separating and joining said sections, and means for preventing shear movement of the sections with respect to each other when in a joined position.

10. In combination with an aircraft, a centrally located divisible float consisting of a plurality of sections hingedly connected to the aircraft, mechanism for separating and joining the sections, studs carried by the interior surface of one of the sections, and sockets in the wall of the other section to receive the studs to prevent shear movement of the sections when in a joined position.

CLEM H. CONGDON.